(12) United States Patent
Hacker et al.

(10) Patent No.: US 6,308,797 B1
(45) Date of Patent: Oct. 30, 2001

(54) MOTORCYCLE TRANSMISSION SHIFTER MECHANISM

(75) Inventors: William J. Hacker; Mark H. Miller, both of Lisbon, WI (US)

(73) Assignee: Harley-Davidson Motor Company Group, Milwaukee, WI (US)

( * ) Notice: Subject to any disclaimer, the term of this patent is extended or adjusted under 35 U.S.C. 154(b) by 0 days.

(21) Appl. No.: 09/620,015

(22) Filed: Jul. 20, 2000

(51) Int. Cl.[7] .................................................. F16H 5/06
(52) U.S. Cl. ..................... 180/230; 74/473.16; 74/337.5; 74/143
(58) Field of Search ...................... 180/219, 230; 74/473.16, 337.5, 143

(56) References Cited

U.S. PATENT DOCUMENTS

| | | |
|---|---|---|
| 474,363 | 5/1892 | Brown . |
| 1,102,940 | 7/1914 | Merchant . |
| 2,520,209 | 8/1950 | Hill . |
| 3,421,384 | 1/1969 | Okamota, et al. . |
| 4,455,884 | 6/1984 | Tsuruta, et al. . |
| 4,491,031 | * 1/1985 | Ooka .................................... 74/337.5 |
| 4,510,820 | 4/1985 | Tsuboi . |
| 4,754,662 | 7/1988 | Misawa . |
| 5,159,847 | 11/1992 | Williams, et al. . |
| 5,411,448 | 5/1995 | Horii, et al. . |
| 5,499,553 | 3/1996 | Schott, et al. . |
| 5,727,426 | 3/1998 | Lykken, et al. . |
| 5,743,148 | 4/1998 | Na . |

OTHER PUBLICATIONS

U.S. Patent Application Ser. No. 09/246,254, filed Feb. 2, 1999.
Dealernews, Aug. 1998, p. 53.

* cited by examiner

*Primary Examiner*—Kevin Hurley
(74) *Attorney, Agent, or Firm*—Michael Best & Friedrich LLP

(57) ABSTRACT

A motorcycle transmission shifter assembly including a cam drum having at least two pins extending therefrom, and a shift mechanism engageable with the pins. The shift mechanism includes a tooth that is operable to engage a first one of the pins to rotate the drum in a first direction and a stop that is operable to engage a second one of the pins to prevent over-rotation of the drum in the first direction. Preferably, the shift mechanism includes a shift pawl and a shift lever and the stop is mounted on either the shift pawl or the shift lever. Additionally, the shift mechanism can include a second stop mounted on the other of the shift pawl or the shift lever, the second stop being operable to engage a third one of the pins to prevent over-rotation of the drum in a second direction.

20 Claims, 7 Drawing Sheets

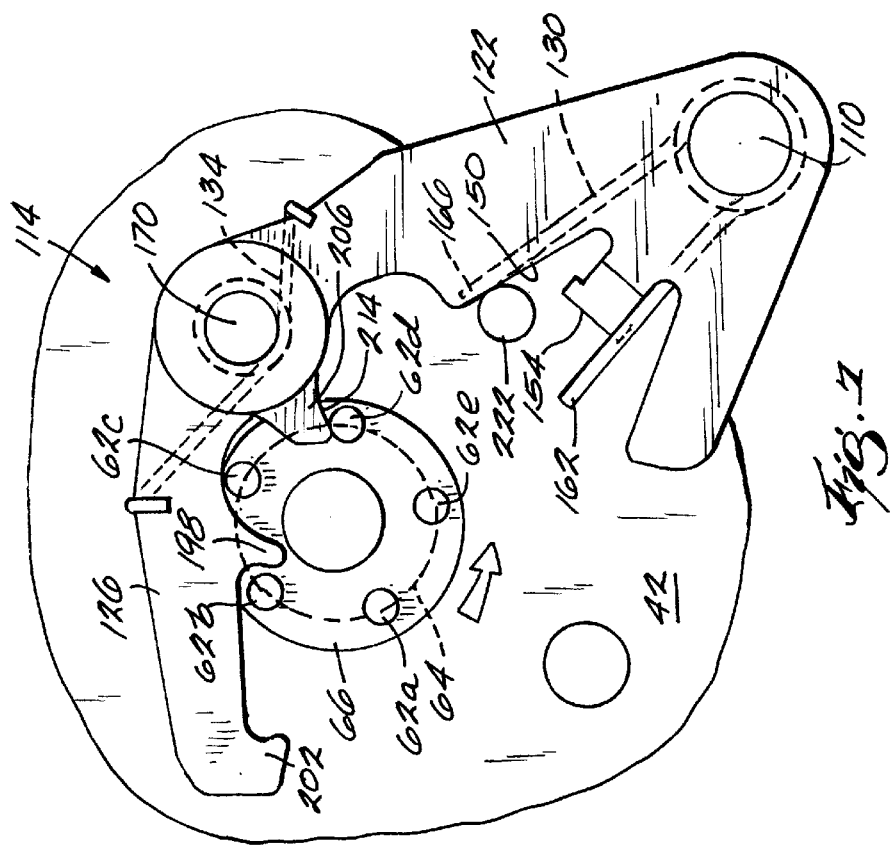
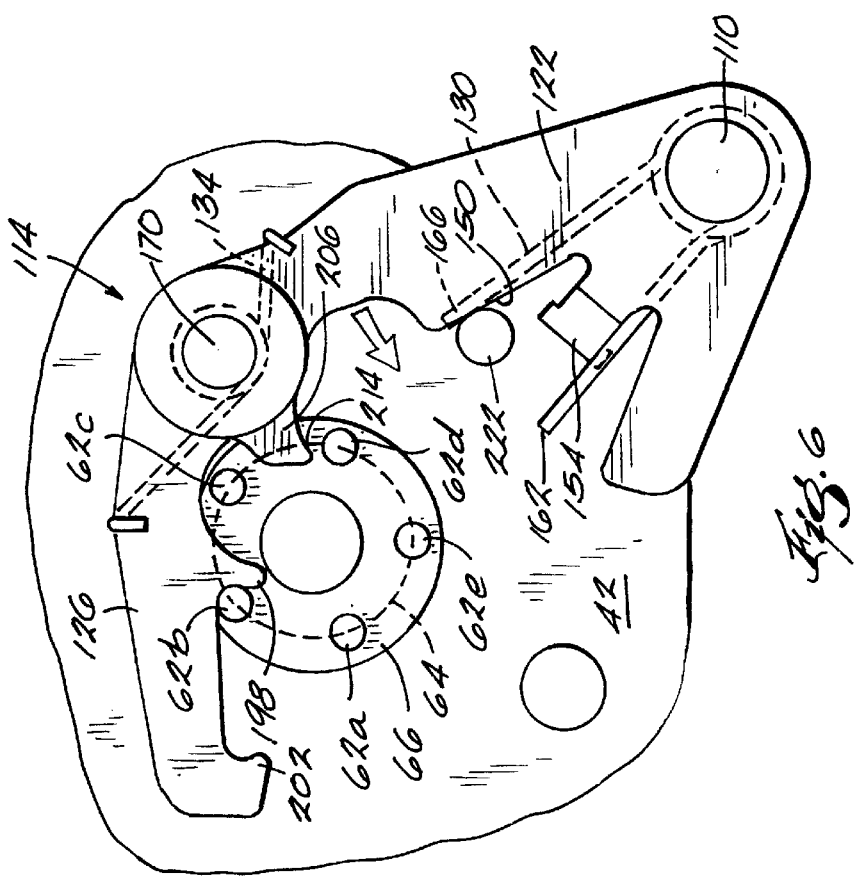

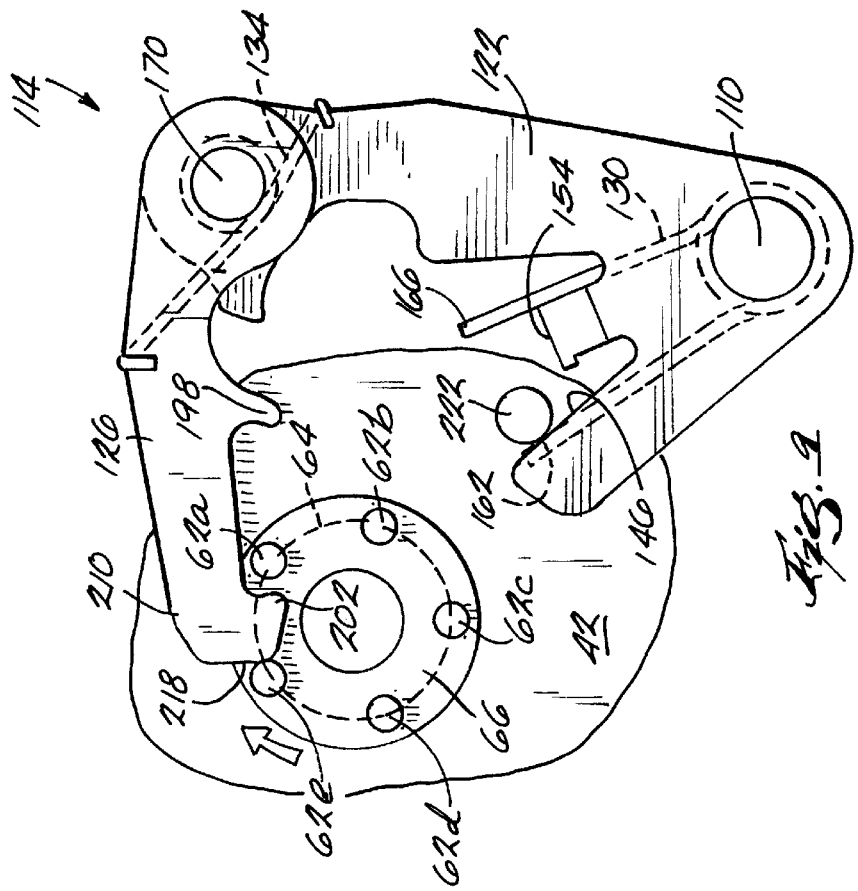
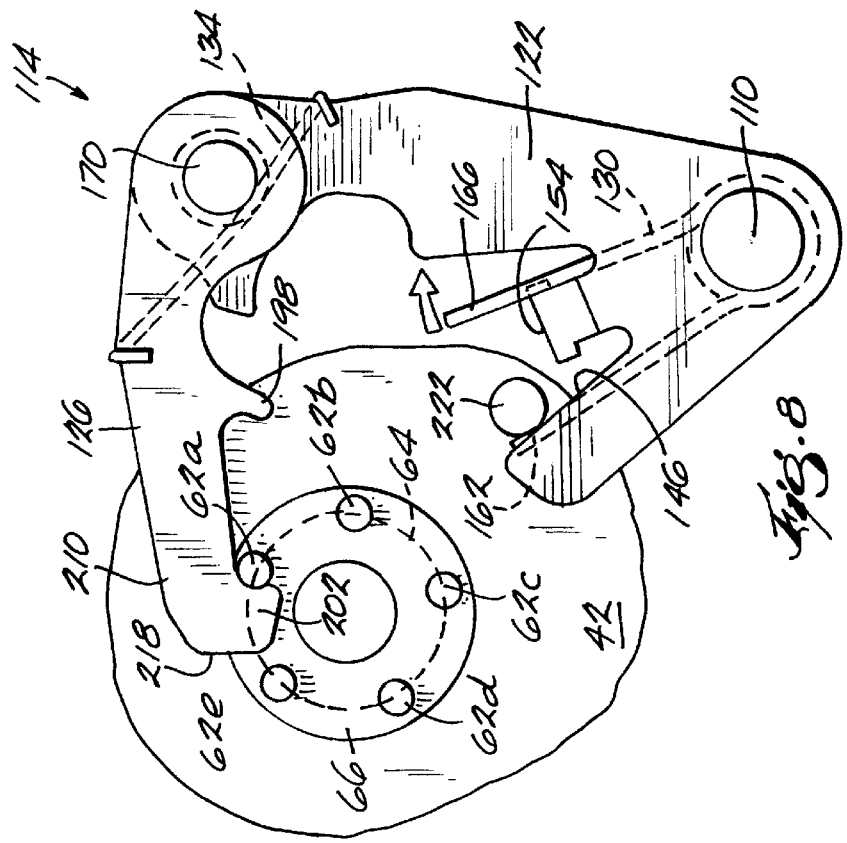

MOTORCYCLE TRANSMISSION SHIFTER MECHANISM

FIELD OF THE INVENTION

The invention relates to motorcycles, and more particularly to transmission shifters for motorcycles.

BACKGROUND OF THE INVENTION

Manual cam drum transmission shifters are well-known and commonly used for shifting between the gears of a motorcycle transmission. Typically, the transmission shifter assemblies include a cam drum that is mounted for rotation within the transmission and designed to move a series of gears. Rotation of the drum results in the shifting of the gears in the transmission.

The cam drum typically includes a plurality of equally spaced pins extending axially therefrom. The pins are engaged by a shift pawl that is pivotally connected to a shift lever. The shift pawl engages the pins to rotate the drum when the shift lever is actuated by the motorcycle operator. The shift pawl typically includes spaced-apart opposing teeth or claws. One tooth is operable to rotate the drum in a first or upshift direction, while the opposing tooth is operable to rotate the drum in a second or downshift direction.

During normal shifting, the shift pawl should rotate the drum by indexing through only one of the spaced-apart pins at a time. Sometimes, however, the rotational inertia of the drum during a shift will be great enough to cause the shift pawl to inadvertently index through two spaced-apart pins at once, thereby allowing over-rotation of the drum. Such over-rotation results in the transmission missing a shift, or skipping a gear, which can be hard on the engine. U.S. Pat. Nos. 3,421,384 and 4,455,884 disclose two transmission shifter assemblies having means for preventing the drum from over-rotating during shifting.

The prevention means utilized in U.S. Pat. No. 3,421,384 includes a cam plate fixed to the drum. The cam plate has concavities that correspond to the low speed, high speed and neutral shift positions. The concavities are separated by large projection portions. A swingable stopper is used to prevent over-rotation of the drum and to prevent rotation of the drum from the high speed position directly to the neutral position, thereby bypassing the low speed position. The swingable stopper has a roller that rides in the concavities of the cam plate to prevent the over-rotation or double shifting of the drum.

The prevention means utilized in U.S. Pat. No. 4,455,884 also includes a cam plate and a shift stopper similar to the one taught in the '384 Patent, but further includes a lock mechanism that more positively prevents the shift drum from turning from the high speed shift position directly to the low speed shift position, thereby bypassing the medium shift position. When such an overshift is attempted, a lock piece engages an opening in the surface of the drum and prevents the transmission from shifting directly from the high speed position to the low speed position. When the shift pedal is released, the shift stopper biases the drum back to its high speed position.

SUMMARY OF THE INVENTION

The present invention provides an improved transmission shifter assembly with positive stop mechanisms to prevent overshifting in both the upshift and downshift directions. The improved shifter assembly has fewer parts, is more compact, is easier to assemble, is more robust, and is less expensive to manufacture than the assemblies disclosed in the prior art. The shifter assembly of the present invention eliminates the need for a separate cam plates, shift stoppers, or any other independent locking members by incorporating upshift and downshift stop mechanisms directly on the shift pawl and/or the shift lever.

More specifically, the invention provides a motorcycle transmission shifter assembly including a cam drum having at least two pins extending therefrom, and a shift mechanism engageable with the pins. The shift mechanism includes a tooth that is operable to engage a first one of the pins to rotate the drum in a first direction and a stop that is operable to engage a second one of the pins to prevent over-rotation of the drum in the first direction.

In a preferred aspect of the invention, the shift mechanism includes a shift pawl and a shift lever and the stop is mounted on either the shift pawl or the shift lever. In another preferred aspect of the invention, the shift mechanism includes a second stop mounted on the other of the shift pawl or the shift lever, the second stop being operable to engage a third pin to prevent over-rotation of the drum in a second direction.

Other features and advantages of the invention will become apparent to those skilled in the art upon review of the following detailed description, claims, and drawings.

BRIEF DESCRIPTION OF THE DRAWINGS

FIG. 6 is a plan view of the shifting mechanism positioned in the upshift state.

FIG. 7 is a plan view of the shifting mechanism positioned in the upshift state during over-rotation of the cam drum.

FIG. 8 is a plan view of the shifting mechanism positioned in the downshift state.

FIG. 9 is a plan view of the shifting mechanism positioned in the downshift state during over-rotation of the cam drum.

Figure 1:
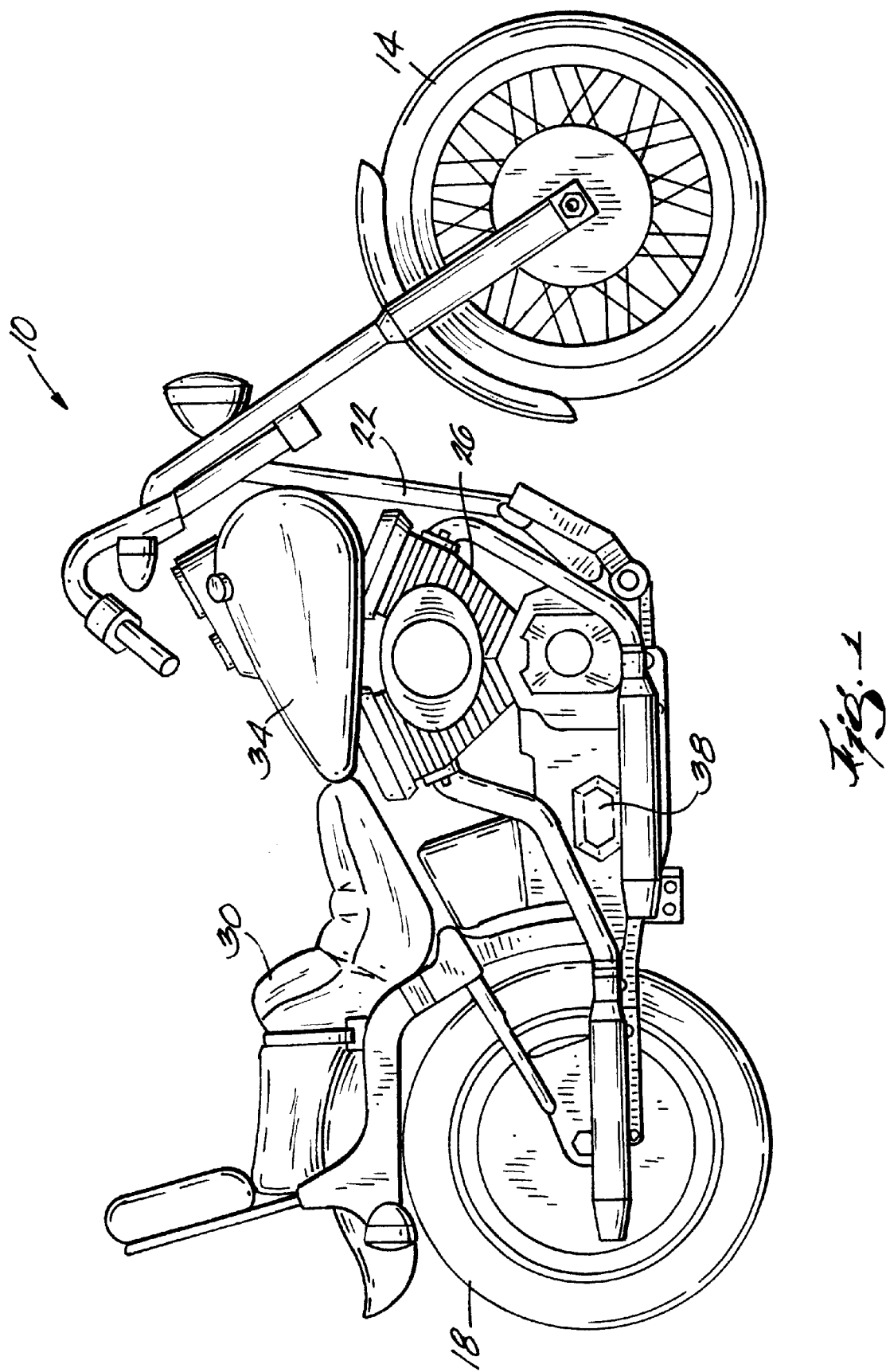
FIG. 1 is a right side view of a motorcycle having a transmission embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

FIG. 1 illustrates a motorcycle 10 embodying the present invention. The motorcycle 10 includes a front wheel 14, a rear wheel 18, a frame 22 supported by the wheels 14 and 18, an engine 26 supported by the frame 22, a seat 30, a tank 34, and a transmission 38 that operates in conjunction with the engine 26.

Figure 2:
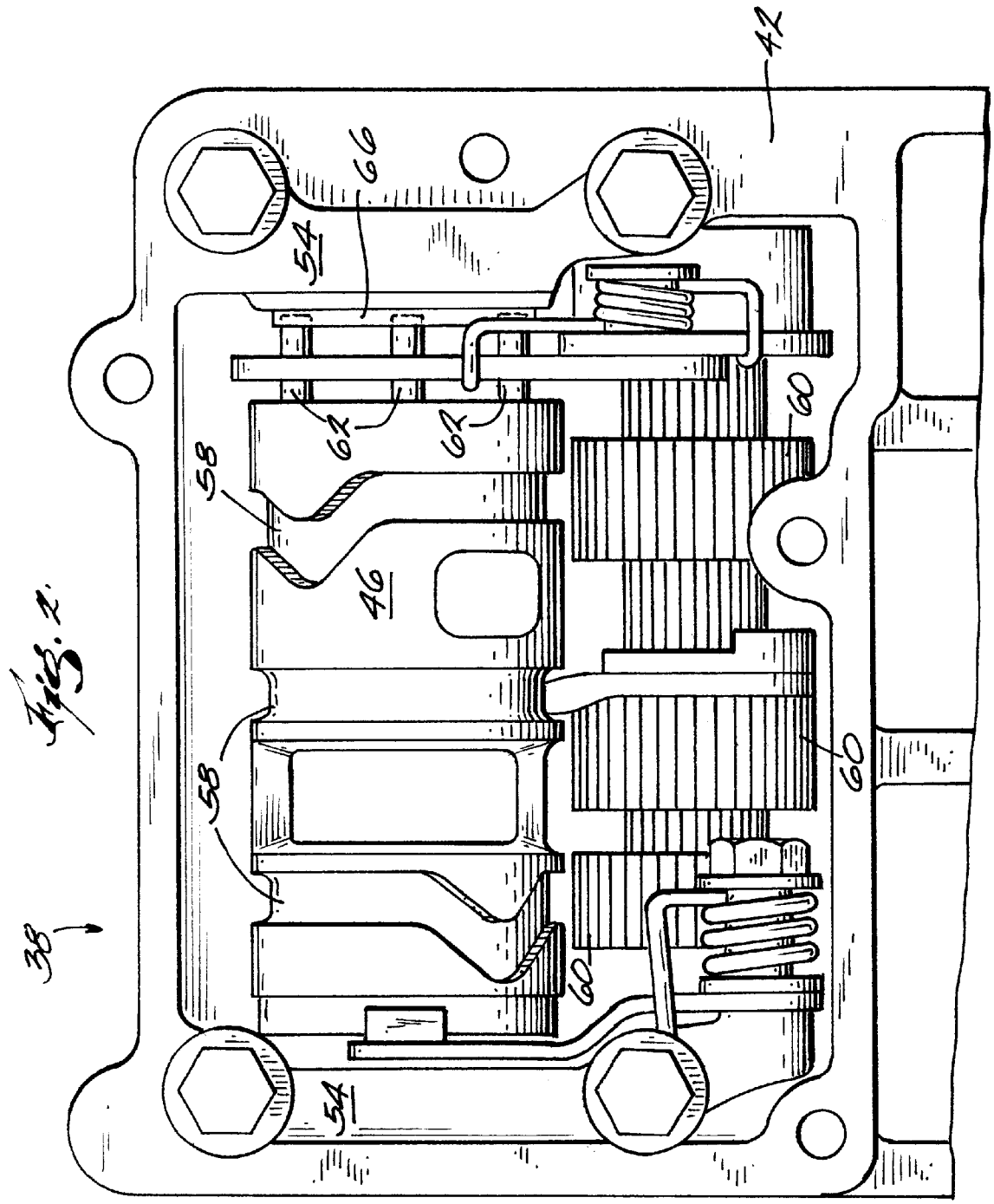
FIG. 2 is a top view of the motorcycle transmission with the top of the housing removed.

As seen in FIG. 2, the transmission 38 is a manually operated transmission that includes a housing 42 having a removable cover (not shown) for granting access to the transmission components. A cam drum 46 is mounted for rotation inside the housing 42. Support shafts (not shown) extend axially from the ends of the cam drum 46 and support the cam drum 46 for rotation between respective bearing supports 54. The cam drum 46 includes a plurality of cam grooves 58 that receive corresponding cam followers (not shown). As the cam drum 46 rotates, the cam followers are displaced by the grooves 58 to effect the shifting of gears 60 as is commonly understood.

Figure 5:
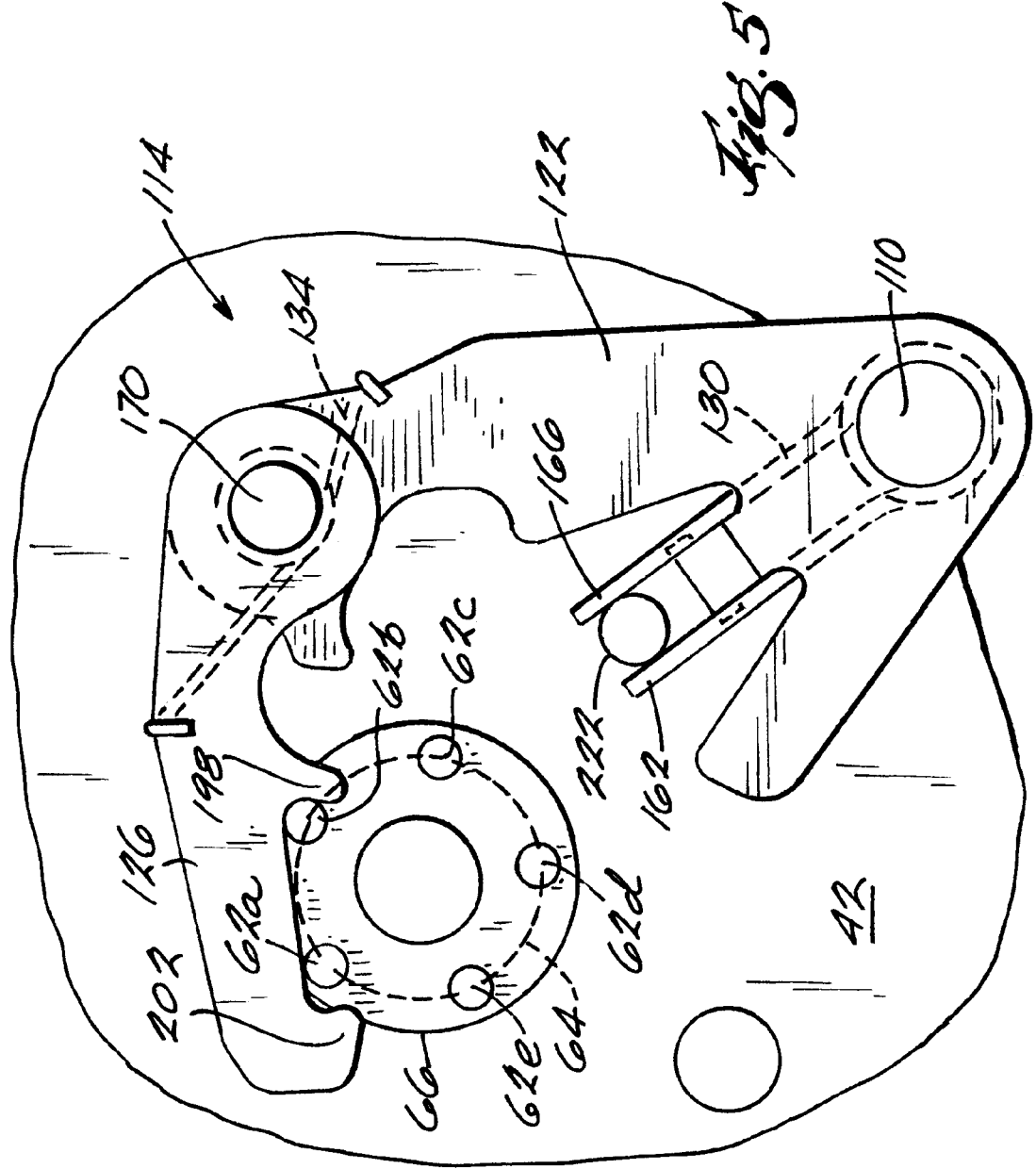
FIG. 5 is an plan view of the shifting mechanism positioned in the home state.

The illustrated cam drum 46 also includes a plurality of equally spaced pins 62 that extend axially from one end of the cam drum 46. As shown in FIG. 5, there are preferably five pins 62a, 62b, 62c, 62d, and 62e, respectively. The rotation of the cam drum 46 defines a pin path 64. As best seen in FIG. 2, the distal ends of the pins 62 are preferably supported by a support disk 66 that is mounted on the support shaft on the same side of the cam drum 46 as the pins 62. The support disk 66 provides added strength to the pins 62 by placing the pins 62 in double shear. Although preferred, the support disk 66 is not a necessary feature of the invention and the pins 62 could extend from the cam drum 46 in cantilevered fashion without any supporting structure at their distal ends.

Figure 3:
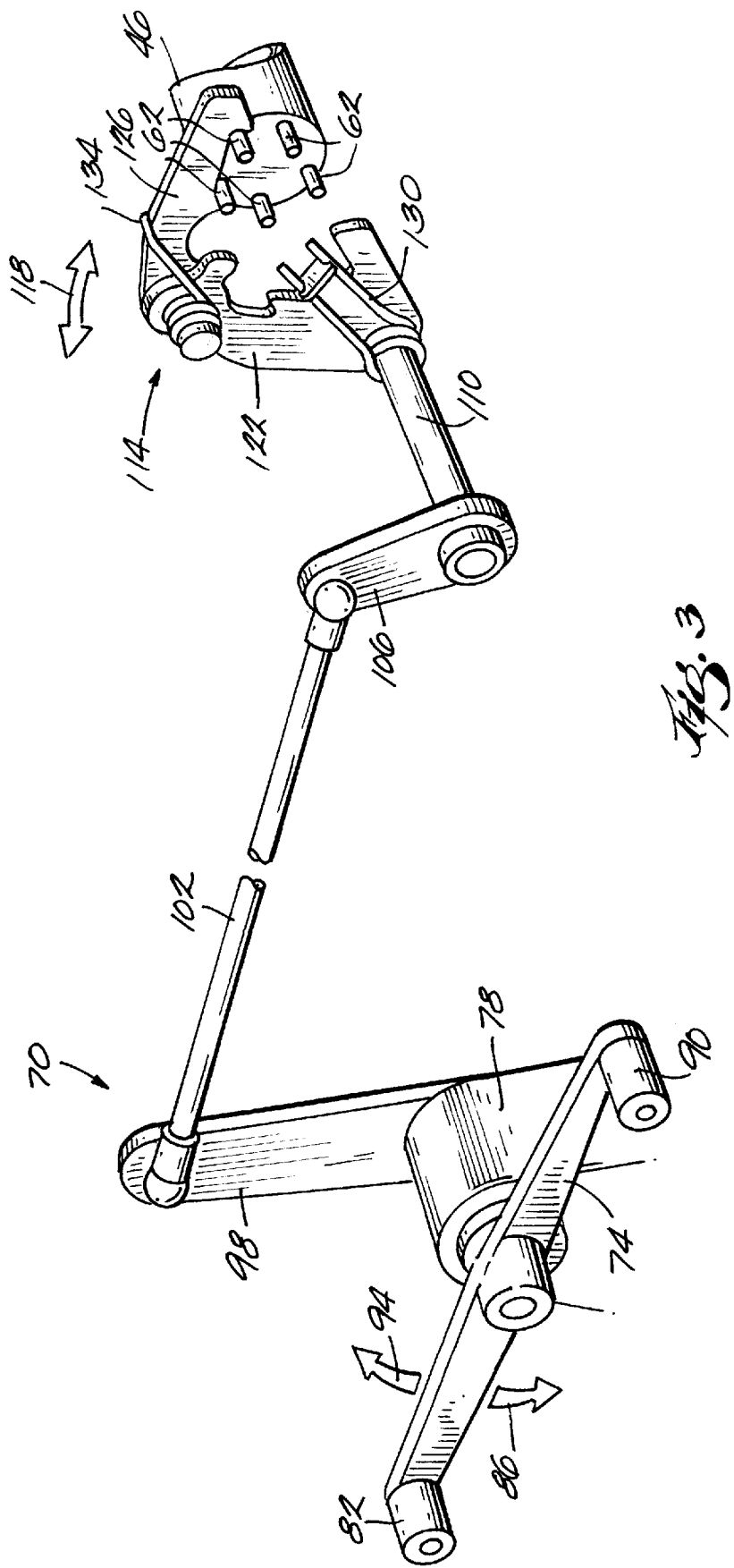
FIG. 3 is a schematic view of a shifting linkage having a shifting mechanism operable to manually shift the transmission.

FIG. 3 schematically illustrates a linkage 70 capable of rotating the cam drum 46 to shift the gears of the motorcycle 10. The linkage 70 is shown for illustrative purposes only and other linkages can be used with the present invention. The linkage 70 includes a foot pedal member 74 which is supported for rocking movement by a suitable support member 78. The driver of the motorcycle 10 can actuate the pedal member 74 by pressing downwardly on the front end portion 82 to rotate the pedal member 74 in the direction of arrow 86. Alternatively, the driver can actuate the pedal member 74 by pressing upwardly on the front end portion 82 or downwardly on the rear end portion 90 to rotate the pedal member 74 in the direction of arrow 94.

The rotation of pedal member 74 causes movement of the first linkage member 98 and the movement translates through the second and third linkage members 102 and 106, respectively. The third linkage member 106 is mounted on one end of a shaft 110 and movement of the third linkage member 106 causes rotation of the shaft 110. A shift mechanism 114 is mounted on the opposite end of the shaft 110 and moves in the directions indicated by arrow 118 depending upon the direction of rotation of the shaft 110.

Figure 4:
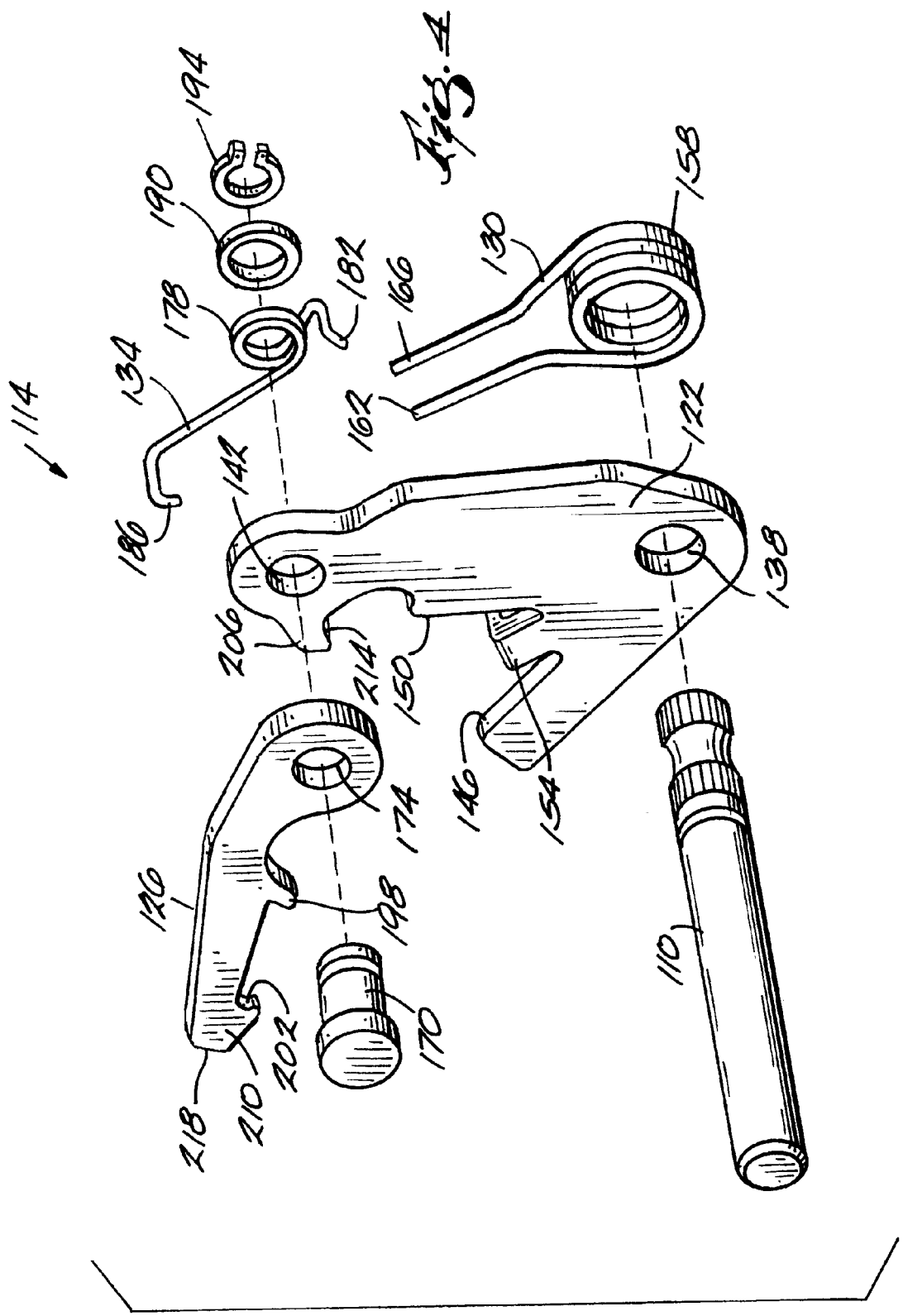
FIG. 4 is an exploded perspective view of the shifting mechanism embodying the invention.

As best seen in FIG. 4, the shift mechanism 114 includes a shift lever 122, a shift pawl 126, a shift return spring 130, and a pawl spring 134. The shift lever 122 has first and second spaced-apart openings 138 and 142, respectively. The first opening 138 receives the shaft 110. The shaft 110 can be press-fit, shrink-fit, welded, or otherwise secured into the opening 138 such that the shift lever 122 rotates with rotation of the shaft 110. The shift lever 122 further includes first and second engaging surfaces 146 and 150, respectively, the purpose of which will be described below. Between the first and second engaging surfaces 146, 150 is an L-shaped portion 154.

The shift return spring 130 has a coil portion 158 and first and second coil ends 162 and 166, respectively. When the shift mechanism 114 is assembled, the shift lever 122 is mounted on the shaft 110 as described above and the coil portion 158 is supported on the shaft 110 adjacent the shift lever 122. The first and second coil ends 162, 166 engage opposite edges of the L-shaped portion 154 and extend beyond the L-shaped portion 154. The shift return spring 130 is operable to bias the shift lever 122 to a home state as shown in FIG. 5 and as will be described in more detail below.

The shift pawl 126 is coupled to the shift lever 122 with a pin 170. The pin 170 extends through a first opening 174 in the shift pawl 126 and through the second opening 142 in the shift lever 122 to couple the shift pawl 126 and the shift lever 122 together and to permit pivotal movement of the shift pawl 126 with respect to the shift lever 122.

The pawl spring 134 includes a coil portion 178 and first and second coil ends 182 and 186, respectively. When the shift mechanism 114 is assembled, the coil portion 178 is supported on the pin 170 adjacent the shift lever 122. The pawl spring 134 is retained on the pin 170 with a washer 190 and a snap ring 194. The first coil end 182 engages the shift lever 122 while the second coil end 186 engages the shift pawl 126. The pawl spring 134 biases the shift pawl 126 toward the shaft 110.

The shift mechanism 114 is operable to shift the gears of the motorcycle 10 by rotating the cam drum 46 in response to driver input on the pedal member 74. Specifically, the shift mechanism 114 includes an upshift tooth or jaw 198 and a downshift tooth or jaw 202, both of which are formed on the shift pawl 126. As seen in FIGS. 5–9, the upshift and downshift teeth 198 and 202 are capable of engaging the pins 62 to selectively rotate the cam drum 46. In the preferred embodiment, the upshift and downshift teeth 198 and 202 are integrally formed with the shift pawl 126.

The shift mechanism 114 of the present invention is also operable to prevent over-rotation of the cam drum 46 during a shift. Specifically, the shift mechanism 114 includes an upshift stop member 206 formed on the shift lever 122 and a downshift stop member 210 formed on the shift pawl 126. The upshift stop member 206 is located adjacent the second opening 142 in the shift lever 122 and is adjacent the upshift tooth 198 when the shifting mechanism 114 is assembled. The upshift stop member 206 includes an engagement surface 214 capable of engaging a pin 62 to prevent further rotation of the cam drum 46 in the upshift direction (see FIG. 7). In the preferred embodiment, the upshift stop member is integral with the shift lever 122.

The downshift stop member 210 is preferably adjacent the downshift tooth 202 and integral with the distal end of the shift pawl 126. The downshift stop member 210 includes an engagement surface 218 that is capable of engaging a pin 62 to prevent further rotation of the cam drum 46 in the downshift direction (see FIG. 9). The upshift and downshift stop members 206 and 210 provide a simple, inexpensive, and robust way to prevent over-rotation of the cam drum 46 and will be described in greater detail below in the discussion of the shifting operation.

FIGS. 5–9 illustrate the shifting operation of the shifting mechanism 114. FIG. 5 shows the shift mechanism 14 being positioned in its home state. The home state is illustrative of a point during operation of the motorcycle 10 when the driver is not shifting gears. In the home state, two pins 62 (pins 62a and 62b in FIG. 5) are positioned between the upshift and downshift teeth 198 and 202. The first and second coil ends 162 and 166 of the shift return spring 130 straddle a lever stop 222 that extends from the housing 42.

FIG. 6 illustrates the upshift state of the shift mechanism 114. The upshift is initiated by the driver actuating the pedal member 74 as described above. As the shaft 110 rotates, the shift lever 122 moves in the direction of the arrow in FIG. 6 until the second engaging surface 150 engages the lever stop 222 to prevent further rotation of the shift lever 122. This movement causes the shift pawl 126 to move such that the upshift tooth 198 engages pin 62b and causes rotation of the cam drum 46 through one pin position in the counter-clockwise direction as viewed in FIG. 6. The rotation of the shift lever 122 causes the second coil end 166 to come out of engagement with the L-shaped portion 154 due to the engagement with the lever stop 222. The increased separation between the coil ends 162, 166 generates a spring force that tends to bias the shift lever 122 back to its home state (see FIG. 5).

When the shift mechanism 114 returns to its home state, the side of the upshift tooth 198 closest to the shift lever 122 engages and slides over pin 62c without causing rotation of the cam drum 46. The pawl spring 134 allows the shift pawl 126 to move slightly upwardly to allow passage of the upshift tooth 198 over the pin 62c, but then biases the shift pawl 126 downwardly into the position illustrated in FIG. 5. After the upshift is complete, the shift mechanism 114 returns to the home state shown in FIG. 5 with the pins 62b and 62c now positioned between the upshift and downshift teeth 198 and 202.

As mentioned above, the shift mechanism 114 can prevent over-rotation of the cam drum 46 during an upshift. The tendency for the cam drum 46 to over-rotate usually occurs when the driver actuates the pedal member 74 with great force or in rapid succession. The inertia with which the cam drum 46 rotates after such actuation overcomes the biasing force of the shift spring 130 that tends to return the shift mechanism 114 to the home state. If such over-rotation is allowed to go unchecked, the cam drum 46 could rotate through two pin positions, thereby skipping a gear.

FIG. 7 illustrates the upshift stop member 206 operating to prevent over-rotation of the cam drum 46. As the cam drum 46 over-rotates in the direction of the arrow in FIG. 7, the pin 62b comes out of engagement with the upshift tooth 198. The upshift stop member 206 is positioned in the pin path 64 between the pins 62c and 62d such that when the cam drum 46 over-rotates, the pin 62d engages the engagement surface 214. The engagement between the engagement surface 214 and the pin 62d prevents the cam drum 46 from rotating through an extra pin position in the upshift direction. Once rotation of the cam drum 46 is stopped, the shift spring 130 biases the shift mechanism 114 back to the home state.

FIG. 8 illustrates the downshift state of the shift mechanism 114. Again, the downshift is initiated by the driver actuating the pedal member 74 as described above. As the shaft 110 rotates, the shift lever 122 moves in the direction of the arrow in FIG. 8 until the first engaging surface 146 engages the lever stop 222 to prevent further rotation of the shift lever 122. This movement causes the shift pawl 126 to move such that the downshift tooth 202 engages pin 62a and causes rotation of the cam drum 46 through one pin position in the clockwise direction as viewed in FIG. 8. The rotation of the shift lever 122 causes the first coil end 162 to come out of engagement with the L-shaped portion 154 due to the engagement with the lever stop 222. The increased separation between the coil ends 162, 166 generates a spring force that tends to bias the shift lever 122 back to its home state (see FIG. 5).

When the shift mechanism 114 returns to its home state, the angled surface of the shift pawl 126 between the downshift tooth 202 and the engagement surface 218 engages and slides over pin 62e without causing rotation of the cam drum 46. The pawl spring 134 allows the shift pawl 126 to move slightly upwardly to allow passage of the downshift tooth 202 over the pin 62e, but then biases the shift pawl 126 downwardly into the position illustrated in FIG. 5. After the downshift is complete, the shift mechanism 114 returns to the home state shown in FIG. 5 with the pins 62e and 62a now positioned between the upshift and downshift teeth 198 and 202.

The shift mechanism 114 also prevents over-rotation of the cam drum 46 during a downshift. FIG. 9 illustrates the downshift stop member 210 operating to prevent over-rotation of the cam drum 46. As the cam drum 46 over-rotates in the direction of the arrow in FIG. 9, the pin 62a comes out of engagement with the downshift tooth 202. The downshift stop member 210 is positioned in the pin path 64 between the pins 62e and 62a such that when the cam drum 46 over-rotates, the pin 62e engages the engagement surface 218. The engagement between the engagement surface 218 and the pin 62e prevents the cam drum 46 from rotating through an extra pin position in the downshift direction. Once rotation of the cam drum 46 is stopped, the shift spring 130 biases the shift mechanism 114 back to the home state.

It should be noted that other variations and configurations for the upshift and downshift teeth 198 and 202, as well as for the upshift and downshift stop members 206 and 210 are contemplated by the present invention. For example, the upshift stop member 206 need not be located adjacent the second opening 142 as shown, but rather could be located in any other location on the shift lever 122 that would allow the upshift stop member 206 to prevent over-rotation of the cam drum 46. More specifically, the upshift stop member 206 could extend from a position closer to the second engaging surface 150 of the shift lever 122. Of course, changing the location of the upshift stop member 206 could (and would likely) entail changing the shape and size of the upshift stop member 206.

In addition, while the upshift stop member 206 is illustrated as being integrally formed with the shift lever 122, it is also possible to integrally form the upshift stop member 206 with the shift pawl 126. Specifically, the upshift stop member 206 could be formed in the shift pawl 126 adjacent the first opening 174. The configuration of such an upshift stop member 206 that is integrally formed on the shift pawl 126 could be substantially similar to the illustrated upshift stop member 206 or could have a different shape.

Likewise, it is possible to form the downshift stop member 210 integrally with the shift lever 122 instead of on the shift pawl 126 as illustrated. Specifically, the downshift stop member 210 could extend from an area of the shift lever 122 adjacent the first engaging surface 146.

Various features of the invention are set forth in the following claims.

What is claimed is:

1. A motorcycle transmission shifter assembly comprising:
   a cam drum having at least two pins extending therefrom; and
   a shift mechanism engageable with the pins and including:
      a tooth that is operable to engage a first one of the pins to rotate the drum in a first direction, and
      a stop that is operable to engage a second one of the pins to prevent over-rotation of the drum in the first direction.

2. The motorcycle transmission shifter assembly of claim 1, wherein the shift mechanism includes a shift pawl, and wherein the stop is mounted on the shift pawl.

3. The motorcycle transmission shifter assembly of claim 2, wherein the tooth is also mounted on the shift pawl, and wherein the shift pawl includes a second tooth spaced from the first tooth and operable to engage a third one of the pins to rotate the drum in a second direction.

4. The motorcycle transmission shifter assembly of claim 1, wherein the stop is at least partially positioned between the first and second pins during rotation of the drum in the first direction.

5. The motorcycle transmission shifter assembly of claim 2, wherein the stop is at least partially positioned between the first and second pins when the stop engages the second pin.

6. The motorcycle transmission shifter assembly of claim 1, wherein the drum is further capable of rotating in a second direction, and wherein the stop does not prevent rotation of the drum in the second direction.

7. The motorcycle transmission shifter assembly of claim 1, wherein the shift mechanism includes a shift lever, and wherein the stop is mounted on the shift lever.

8. The motorcycle transmission shifter assembly of claim 7, wherein the shift mechanism further includes a shift pawl pivotally coupled to the shift lever, and a pawl spring engageable with the shift pawl and the shift lever to bias the shift pawl with respect to the shift lever.

9. A motorcycle comprising:

two wheels;

a frame supported by the two wheels;

an engine supported by the frame; and a transmission shifter assembly adjacent the engine and including:
  a cam drum having at least two pins extending therefrom; and
  a shift mechanism engageable with the pins and having:
    a tooth that is operable to engage a first one of the pins to rotate the drum in a first direction, and
    a stop that is operable to engage a second one of the pins to prevent over-rotation of the drum in the first direction.

10. The motorcycle of claim 9, wherein the shift mechanism includes a shift pawl, and wherein the stop is mounted on the shift pawl.

11. The motorcycle of claim 10, wherein the tooth is also mounted on the shift pawl, and wherein the shift pawl includes a second tooth spaced from the first tooth and operable to engage a third one of the pins to rotate the drum in a second direction.

12. The motorcycle of claim 9, wherein the stop is at least partially positioned between the first and second pins during rotation of the drum in the first direction.

13. The motorcycle of claim 9, wherein the stop is at least partially positioned between the first and second pins when the stop engages the second pin.

14. The motorcycle of claim 9, wherein the drum is further capable of rotating in a second direction, and wherein the stop does not prevent rotation of the drum in the second direction.

15. The motorcycle of claim 9, wherein the shift mechanism includes a shift lever, and wherein the stop is mounted on the shift lever.

16. A motorcycle transmission shifter assembly comprising:

a cam drum having a plurality of pins extending therefrom;

a shift pawl engageable with the pins and including
  a first tooth operable to engage a first one of the pins to rotate the drum in a first direction,
  a second tooth operable to engage a second one of the pins to rotate the drum in a second direction,
  a stop that is operable to engage a third one of the pins to prevent over-rotation of the drum in the first direction; and a shift lever pivotally coupled to the shift pawl and including a stop that is operable to engage a fourth one of the pins to prevent over-rotation of the drum in the second direction.

17. The motorcycle transmission shifter assembly of claim 16, wherein the rotation of the cam drum defines a pin path and wherein the stop on the shift pawl is at least partially positioned in the pin path between the first and third pins when the cam drum rotates in the first direction.

18. The motorcycle transmission shifter assembly of claim 16, wherein the rotation of the cam drum defines a pin path and wherein the stop on the shift lever is at least partially positioned in the pin path between the second and fourth pins when the cam drum rotates in the second direction.

19. The motorcycle transmission shifter assembly of claim 16, wherein the stop on the shift pawl is adjacent the first tooth.

20. The motorcycle transmission shifter assembly of claim 16, wherein the stop on the shift lever is adjacent the second tooth.

* * * * *